United States Patent
Aronica et al.

(10) Patent No.: US 6,566,289 B2
(45) Date of Patent: May 20, 2003

(54) WHITE ENAMEL FOR ALUMINIZED OR GALVANIZED STEEL

(75) Inventors: Alain Aronica, Saint-Dizier (FR); Emmanuel Marinho, Frampas (FR); David Coutouly, Bettancourt-la-Ferree (FR); Luc Allemeersch, Saint-Eulien (FR); Christophe Reb, Haussignemont (FR)

(73) Assignee: Ferro France - S.A.R.L., Saint Dizier (FR)

( * ) Notice: Subject to any disclaimer, the term of this patent is extended or adjusted under 35 U.S.C. 154(b) by 0 days.

(21) Appl. No.: 09/932,472

(22) Filed: Aug. 17, 2001

(65) Prior Publication Data

US 2002/0061809 A1 May 23, 2002

(30) Foreign Application Priority Data

Sep. 22, 2000 (EP) .............................. 00120780

(51) Int. Cl.$^7$ .............................. C03C 8/08; C03C 8/14; C03C 8/16; C03C 3/17; C03C 8/20
(52) U.S. Cl. .............................. 501/24; 501/11; 501/46; 501/17; 501/18; 501/48; 501/79; 501/47
(58) Field of Search ............................... 501/11, 14, 16, 501/17, 18, 20, 21, 24, 48, 46, 47, 79

(56) References Cited

U.S. PATENT DOCUMENTS

| | | | |
|---|---|---|---|
| 2,576,916 A | 12/1951 | Beals et al. | 106/48 |
| 2,608,490 A | 8/1952 | Donahey | 106/48 |
| 2,866,713 A | 12/1958 | Allen | 106/48 |
| 3,926,246 A | * 12/1975 | Corbett et al. | 164/459 |
| 5,393,714 A | * 2/1995 | Thometzek et al. | 106/489 |
| 5,856,015 A | * 1/1999 | Buchanan | 428/426 |

FOREIGN PATENT DOCUMENTS

| | | |
|---|---|---|
| EP | 0 916 624 A1 * | 5/1999 |
| EP | 0950644 | 10/1999 |
| GB | 718132 | 11/1954 |
| GB | 818264 | 8/1959 |
| JP | 383836 | 4/1991 |

* cited by examiner

*Primary Examiner*—David Sample
*Assistant Examiner*—Elizabeth A. Bolden
(74) *Attorney, Agent, or Firm*—Rankin, Hill, Porter & Clark LLP

(57) ABSTRACT

The present invention provides a composition for use in forming a white porcelain enamel coating on aluminized or galvanized steel. The composition according to the present invention includes a solids portion including a glass component and a white pigment. The glass component includes one or more glass frits including by weight from about 30% to 50% $P_2O_5$, from about 15% to about 30% $Al_2O_3$, from about 8% to about 40% $X_2O$ where X=Na and/or K, up to about 30% $TiO_2$, up to about 12% $B_2O_3$, up to about 10% $K_2O$, up to about 10% ZnO, up to about 8% $SiO_2$, up to about 7% $La_2O_3$, up to about 5% $Li_2O$, and up to about 15% F. The white pigment include $TiO_2$. The present invention also provides a method of forming a white porcelain enamel coating on an aluminized or galvanized steel substrate that includes providing a steel substrate having an aluminized or galvanized surface, providing a composition for use in forming a white porcelain enamel coating as previously described, applying the composition to the aluminized or galvanized surface, and firing the composition to form a white porcelain enamel coating. And, the present invention also provides a section of aluminized or galvanized steel having a white porcelain enamel coating disposed thereon, with the white porcelain enamel coating exhibiting an acid resistance of AA or better according to ISO 2722, a class 1 bond adherence rating according to EN 12209, and an opacity of L≧94 according to the CIE L*a*b* uniform color space, where $L^* = 116 (Y/Y_0)^{1/2} - 16$ for $Y/Y_0$) 0.008856.

9 Claims, No Drawings

WHITE ENAMEL FOR ALUMINIZED OR GALVANIZED STEEL

FIELD OF INVENTION

The present invention concerns a composition for use in forming a white porcelain enamel coating on aluminized or galvanized steel, a method of forming such a coating on a section of aluminized or galvanized steel, and a section of aluminized or galvanized steel having a white porcelain enamel coating disposed thereon.

BACKGROUND OF THE INVENTION

Only a few compositions are known that are specifically intended for use in forming white porcelain enamel coatings on aluminized or galvanized steel. An example of one such prior art composition for use on aluminized steel is disclosed in EP 0 950 644 A1. Additional compositions are needed that can be used to form white porcelain enamel coating on aluminized steel. Preferably, such porcelain enamel coatings would exhibit surface properties that are similar to the surface properties of conventional white porcelain enamel coatings formed on sheet steel.

SUMMARY OF INVENTION

The present invention is directed to a composition that can be used to form a white porcelain enamel coating on aluminized or galvanized steel that exhibits excellent opacity and other highly desirable surface properties. The composition according to the present invention comprises a solids portion comprising a glass component and a white pigment. The glass component comprises one or more glass frits comprising by weight from about 30% to 50% $P_2O_5$, from about 15% to about 30% $Al_2O_3$, from about 8% to about 40% $X_2O$ where X=Na and/or K, up to about 30% $TiO_2$, up to about 12% $B_2O_3$, up to about 10% ZnO, up to about 8% $SiO_2$, up to about 7% $La_2O_3$, up to about 5% $Li_2O$, and up to about 15% F. The white pigment comprises $TiO_2$.

The method according to the present invention comprises providing a steel substrate having an aluminized or galvanized surface providing a composition for use in forming a white porcelain enamel coating as previously described above, applying the composition to the aluminized or galvanized surface, and firing the composition to form a white porcelain enamel coating. Preferably, the aluminized or galvanized surface is cleaned using an alkaline solution prior to the application of the composition. A white porcelain enamel coating formed according to the method of the present invention will typically have a thickness of from about 20 to about 250 microns, with a thickness of from about 40 to about 150 microns being desired. Firing is typically accomplished at a temperature below the point at which the metal coating applied to the steel substrate begins to melt, with the range of typical firing temperatures being from about 500° C. to about 700° C.

The invention also provides a section of aluminized or galvanized steel having a white porcelain enamel coating disposed thereon. The coating is formed by applying a composition according to the invention to an aluminized or galvanized surface of the section according to the method of the invention. A section of aluminized or galvanized steel having a white porcelain enamel coating according to the invention will exhibit an acid resistance of AA or better according to ISO 2722, a class 1 bond adherence rating according to EN 12209, and an opacity of $L^* \geq 94$ according to the CIE $L^*a^*b^*$ uniform color space, where $L^*=116 (Y/Y_0)^{1/3}-16$ for $Y/Y_0$ ) 0.008858.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION OF PREFERRED EMBODIMENTS

The composition according to the present invention is particularly well-suited for use in forming white porcelain enamel coatings on aluminized or galvanized steel such as is typically used in automotive, appliance, building material, cookware, and other applications where rust resistance is desired. Throughout the instant specification in the appended claims, the term "aluminized steel" should be understood to mean steel that has been coated with aluminum or an aluminum alloy. Typically, sheet steel is aluminized using a dipping process, which results in an aluminum or aluminum alloy coating having a thickness of from about 10 to about 100 microns. When the composition according to the present invention is applied to an aluminum alloy surface, it is preferable for the silicon content of the aluminum alloy to be less than about 15% by weight.

Also throughout the instant specification in the appended claims, the term "galvanized steel" should be understood to mean steel that has been coated with zinc or a zinc alloy. Typically, sheet steel is galvanized using a dipping process or an annealing process, which results in a zinc or zinc alloy coating having a thickness of from about 10 to about 100 microns. In the literature, such steel is typically referred to as galvanized, galvannealed, or galvalumed (steel coated with Zn—Al alloy).

The composition according to the present invention preferably comprises a solids portion comprising a glass component and a white pigment. The glass component preferably comprises one or more glass frits. The glass frits comprising the glass component preferably provide a compositions by weight as follows:

| Constituent | Range | Preferred Range |
|---|---|---|
| $P_2O_5$ | 30–50 | 30.6–45.9 |
| $Al_2O_3$ | 15–30 | 19.1–28.7 |
| $X_2O$* | 0–40 | 13.9–20.8 |
| $Na_2O$ | | 3.4–5.1 |
| $K_2O$ | | |
| $TiO_2$ | 0–30 | 0–7 |
| $B_2O_3$ | 0–12 | 4.1–6.1 |
| ZnO | 0–10 | 2.3–3.4 |
| $SiO_2$ | 0–8 | 1.8–2.7 |
| $La_2O_3$ | 0–7 | 0–2 |
| $Li_2O$ | 0–5 | 1.0–1.5 |
| F | 0–15 | 4.5–6.8 |

*where X = Na and/or K

In addition to the foregoing, it will be appreciated that the glass component can further optionally comprise minor amounts of other materials such as, for example, $MoO_3$, $SnO_2$, $CeO_2$, BaO, MgO, SrO, and $Bi_2O_3$.

The glass frit or frits that comprise the glass component may be prepared utilizing conventional glass melting techniques. A conventional ceramic refractory, fused silica, or platinum crucible may be used to prepare the glass frit.

Typically, selected oxides are smelted using continuous, rotary, electrical, or induction smelters at about 1100 to about 1300° C. for about 25 to about 60 minutes. The molten glass formed in the crucible is then converted to glass frit using water-cooled rollers and milling equipment. It will be appreciated that the step of producing the glass frit is not per se critical and any of the various techniques well-known to those skilled in the art can be employed.

As noted above, the solids portion of the composition according to the invention also comprises a white pigment, which is preferably milled with the glass component. $TiO_2$ is the most preferred white pigment, and the solids portion of the composition according to the invention preferably comprises at least about 15% by weight $TiO_2$. It will be appreciated that other pigments and/or colorants can also be included in the composition to obtain an enamel having a desired coloring.

The solids portion of the composition according to the present invention can further comprise other mill additions such as pH buffers and texture enhancers. Suitable mill additions include, for example, KOH, NaOH, sodium metasilicate, $La_2O_3$, LiF, $WO_3$, $MoO_3$, ZnS, $H_3BO_3$, sodium silicate, and $K_2CO_3$.

Preferably, the glass component comprises at least about 65% by weight of the solids portion of the composition, with the white pigment and any optional mill additions accounting for the balance. More preferably, the glass component comprises about 75% by weight of the solids portion of the composition with the white pigment and any optional mill additions comprising the balance. Although milling fineness is not per se critical, the solids portion of the composition is preferably milled to a fineness of less than about 5 cc being retained from a 50 cc sample on a 400 mesh sieve.

The composition according to the invention can further comprise a vehicle. The presently preferred vehicle is water, but other vehicles commonly used with enamel compositions could be used. The amount of vehicle used will depend in large part upon the application technique being employed.

The composition according to the present invention can be applied using any of the conventional wet application processes, which are well-known. Suitable wet application processes include spray, dipping, flow coating, and electrophoretic deposition. The disclosures of U.S. Pat. Nos. 5,002,903, 4,085,021 and 3,841,986 are incorporated herein by reference for their teachings relative to the electrophoretic application of porcelain enamel coating compositions.

The composition according to the invention can also be applied by dry application techniques. In such circumstances, a suitable organopolysiloxane is added to the composition so that it may be applied by conventional dry application means such as a standard corona discharge gun. The disclosures of U.S. Pat. Nos. 4,110,487 and 3,928,668 are hereby incorporated by reference for their teachings relative to the dry or electrostatic application of porcelain enamel coating compositions.

Preferably, the composition is applied so as to provide a coating thickness of from about 20 to about 250 microns, and more preferably from about 40 to about 150 microns, subsequent to firing. The coating thickness is not critical, and can be varied based upon the particular application or need.

The method of forming a white porcelain enamel coating on an aluminized or galvanized surface of a steel substrate according to the present invention comprises providing a steel substrate having an aluminized or galvanized surface. Preferably, the aluminized or galvanized surface has a thickness of from about 10 to about 100 microns and is cleaned using an alkaline solution prior to the application of the enamel composition. The method according to the present invention also comprises providing an enamel composition as previously described above, applying the composition to the aluminized or galvanized surface, and firing the composition to form a white porcelain enamel coating.

Firing of the composition is typically accomplished at a temperature within the range of from about 500° C. to about 700° C. Preferably, firing is accomplished at a temperature of from about 570±30° C. for about 4 to about 6 minutes. Firing temperature and times are not per se critical to the invention, but firing should be accomplished below the point at which the metal coating applied to the steel substrate begins to melt.

The present invention also provides a section of aluminized or galvanized steel having a white porcelain enamel coating disposed thereon. The white porcelain enamel coating is formed by applying a composition according to the invention as previously described above to an aluminized or galvanized surface of a section of aluminized or galvanized steel and firing the composition. A section of aluminized or galvanized steel having a white porcelain enamel coating disposed thereon according to the invention will exhibit an acid resistance of AA or better according to ISO 2722 and a class 1 bond adherence rating according to EN 12209. Such a section of aluminized or galvanized steel will also exhibit an opacity of $L^* \geqq 94$ according to the CIE $L^*a^*b^*$ uniform color space, where $L^*=116$ $(Y/Y_0)^{1/3}-16$ for $Y/Y_0)$ 0.008856.

The following examples are intended only to illustrate the invention and should not be construed as imposing limitations upon the claims;

EXAMPLE I

A glass frit having the following composition by weight was prepared using a platinum crucible and conventional glass melting techniques:

| Constituent | Amount |
| --- | --- |
| $P_2O_5$ | 37.9 |
| $Al_2O_3$ | 23.7 |
| $Na_2O$ | 17.2 |
| $B_2O_3$ | 5.1 |
| $K_2O$ | 4.2 |
| ZnO | 2.8 |
| $SiO_2$ | 2.2 |
| $Li_2O$ | 1.3 |
| F | 5.5 |

EXAMPLE II

A porcelain enamel slip was prepared by milling the following constituents to a fineness of 1.5 cc being retained from a 50 cc sample on a 400 mesh sieve:

| Constituent | Parts by Weight |
| --- | --- |
| Glass Frit from Example I | 100 |
| $TiO_2$ | 30 |
| $La_2O_3$ | 5 |
| LiF | 0.5 |
| Water | 50 |

EXAMPLE III

The porcelain enamel slip formed in Example II was applied to a section of sheet steel that had been coated with 50 microns of aluminum. Prior to application of the porcelain enamel slip, the aluminum surface was degreased using an alkali cleaning solution. The porcelain enamel slip from Example II was applied by wet spraying at a rate of approximately 250 g/m². The coated section of aluminized steel was then fired at a temperature of about 570° C. for about 5 minutes. After cooling to room temperature, the coated section of aluminized steel was tested for acid resistance, bond strength and opacity. The coated section of aluminized steel exhibited an acid resistance of AA according to ISO 2722, a class 1 bond adherence rating according to EN 12209, and an opacity of L=95 according to the CIE L*a*b* uniform color space, where $L^*=116 (Y/Y_0)^{1/3}-16$ for $Y/Y_0)0.008856$.

EXAMPLE IV

The porcelain enamel slip formed in Example II was applied to a section of sheet steel that had been coated with 50 microns of zinc by dipping. Prior to application of the porcelain enamel slip, the zinc surface was degreased using an alkali cleaning solution. The section of galvanized steel wag preheated between 550° C. for about 5 minutes and then allowed to cool to room temperature. The porcelain enamel slip from Example II was applied by wet spraying at a rate of approximately 250 g/m². The coated section of galvanized steel was then fired at a temperature of about 570° C. for about 5 minutes. After cooling to room temperature, the coated section of galvanized steel was tested for acid resistance, bond strength and opacity. The coated section of galvanized steel exhibited an acid resistance of AA according to ISO 2722, a class 1 bond adherence rating according to EN 12209, and an opacity of L=95 according to the CIP L*a*b* uniform color space, where $L^*=116 (Y/Y_0)^{1/3}-16$ for $Y/Y_0) 0.008856$.

Additional advantages and modifications will readily occur to those skilled in the art. Therefore, the invention in its broader aspects is not limited to the specific details and illustrative examples shown and described herein. Accordingly, various modifications may be made without departing from the spirit or scope of the general inventive concept as defined by the appended claims and their equivalents

What is claimed:

1. A composition for use in forming a white porcelain enamel coating on aluminized or galvanized steel, said composition comprising a solids portion comprising a glass component and a white pigment, said glass component comprising one or more glass frits comprising by weight from about 30.6% to 45.9% $P_2O_5$, from about 19.1% to about 28.7% $Al_2O_3$, from about 13.9% to about 20.8% $Na_2O$, from about 4.1% to about 6.1% $B_2O_3$, from about 3.4% to about 5.1% $K_2O$, from about 2.3% to about 3.4% ZnO, from about 1.8% to about 2.7% $SiO_2$, from about 1.0% to about 1.5% $Li_2O$, and from about 4.5% to about 6.8% F, and said white pigment comprising $TiO_2$.

2. The composition according to claim 1 further comprising $La_2O_3$ and LiF as mill additions.

3. The composition according to claim 2 comprising from about 80 to 120 parts by weight of said first glass frit, from about 24 to about 36 parts by weight $TiO_2$, from about 4 to about 6 parts by weight $La_2O_3$, and from about 0.4 to about 0.6 parts by weight LiF.

4. The composition according to claim 1, wherein said glass component comprises at least about 65% by weight of said solids portion.

5. The composition according to claim 1 further comprising one or more mill additions selected from the group consisting of KOH, NaGH, sodium metasilicate, $La_2O_3$, LiF, $WO_3$, $MoO_3$, ZnS, $H_3BO_3$, sodium silicate, $K_2CO_3$, and mixtures of the foregoing.

6. The composition according to claim 1, wherein said solids portion is milled to a fineness of less than about 5 cc being retained from a 50 cc sample on a 400 mesh sieve.

7. The composition according to claim 1 wherein said glass component further comprises one or more selected from the group consisting of $MoO_3$, $SnO_2$, $CeO_2$, BaO, MgO, SrO, and $Bi_2O_3$.

8. The composition according to claim 1 further comprising a vehicle.

9. The composition according to claim 8 wherein said vehicle comprises water.

* * * * *